(12) United States Patent
Bikmukhametov et al.

(10) Patent No.: US 11,196,109 B2
(45) Date of Patent: Dec. 7, 2021

(54) BATTERY MODULE AND BATTERY MODULE STACK FOR A MOTOR VEHICLE

(71) Applicant: Bayerische Motoren Werke Aktiengesellschaft, Munich (DE)

(72) Inventors: Ramil Bikmukhametov, Munich (DE); Matthias Frahm, Munich (DE); Dominik Gruber, Munich (DE); Thomas Herrmann, Illerkirchberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 176 days.

(21) Appl. No.: 16/658,391

(22) Filed: Oct. 21, 2019

(65) Prior Publication Data

US 2020/0052354 A1 Feb. 13, 2020

Related U.S. Application Data

(63) Continuation of application No. PCT/EP2018/069865, filed on Jul. 23, 2018.

(30) Foreign Application Priority Data

Aug. 3, 2017 (DE) ...................... 10 2017 213 470.4

(51) Int. Cl.
*H01M 10/6557* (2014.01)
*H01M 10/613* (2014.01)
(Continued)

(52) U.S. Cl.
CPC ......... *H01M 10/6557* (2015.04); *B60L 50/64* (2019.02); *H01M 10/613* (2015.04);
(Continued)

(58) Field of Classification Search
CPC ........... H01M 10/6557; H01M 10/613; H01M 10/625; H01M 10/6554; H01M 10/6567; H01M 2220/20; B60L 50/64
See application file for complete search history.

(56) References Cited

U.S. PATENT DOCUMENTS 8,920,955 B1 12/2014 Chuang et al.
9,935,340 B2 * 4/2018 Lee ....................... H01M 50/20
(Continued)

FOREIGN PATENT DOCUMENTS

CN 101919085 A 12/2010
CN 102057519 A 5/2011
(Continued)

OTHER PUBLICATIONS

International Search Report (PCT/ISA/210) issued in PCT Application No. PCT/EP2018/069865 dated Nov. 23, 2018 with English translation (seven (7) pages).
(Continued)

*Primary Examiner* — Stewart A Fraser
(74) *Attorney, Agent, or Firm* — Crowell & Moring LLP

(57) ABSTRACT

A battery module for a motor vehicle includes two contact-making plates, which are arranged in parallel or approximately in parallel with one another, including a first and a second contact-making plate, and a plurality of battery cells, which are arranged next to one another and between the two contact-making plates. Each battery cell has a longitudinal axis and two axially opposite ends. The ends of each battery cell are connected to the contact-making plates, and the battery cells are arranged in such a way that i) an outer circumferential surface of each battery cell fully surrounded by adjacent battery cells touches outer circumferential surfaces of at least three adjacent battery cells, and ii) an outer circumferential surface of each battery cell not fully sur-
(Continued)

rounded by adjacent battery cells touches outer circumferential surfaces of at least two adjacent battery cells.

12 Claims, 2 Drawing Sheets

(51) Int. Cl.
    *H01M 10/625*     (2014.01)
    *H01M 10/6554*     (2014.01)
    *H01M 10/6567*     (2014.01)
    *B60L 50/64*     (2019.01)
    *H01M 50/20*     (2021.01)

(52) U.S. Cl.
    CPC ..... *H01M 10/625* (2015.04); *H01M 10/6554* (2015.04); *H01M 10/6567* (2015.04); *H01M 50/20* (2021.01); *H01M 2220/20* (2013.01)

(56) References Cited

U.S. PATENT DOCUMENTS

| | | |
|---|---|---|
| 2009/0297892 A1 | 12/2009 | Ijaz et al. |
| 2017/0005383 A1 | 1/2017 | Harris |
| 2017/0025657 A1 | 1/2017 | Reinshagen et al. |
| 2018/0034020 A1* | 2/2018 | Neuss ............... H01M 10/0525 |
| 2019/0181399 A1* | 6/2019 | Kaga ................. H01M 10/653 |

FOREIGN PATENT DOCUMENTS

| | | |
|---|---|---|
| CN | 102421641 A | 4/2012 |
| CN | 102593389 A | 7/2012 |
| CN | 103208603 A | 7/2013 |
| CN | 10341594 A | 11/2013 |
| CN | 103670810 A | 3/2014 |
| CN | 106463670 A | 2/2017 |
| DE | 10 2010 013 021 A1 | 9/2011 |
| DE | 10 2011 101 022 A1 | 11/2012 |
| DE | 10 2014 206 646 A1 | 10/2015 |
| DE | 10 2014 112 627 A1 | 3/2016 |
| JP | 2011113641 A | 6/2011 |
| KR | 20170051817 A | 5/2017 |

OTHER PUBLICATIONS

German-language Written Opinion (PCT/ISA/237) issued in PCT Application No. PCT/EP2018/069865 dated Nov. 23, 2018 (five (5) pages).

German-language Search Report issued in counterpart German Application No. 10 2017 213 470.4 dated Apr. 23, 2018 with partial English translation (13 pages).

Chinese Office Action issued in Application No. 201880029974.9 dated Sep. 27, 2021 with English translation (22 pages).

* cited by examiner

BATTERY MODULE AND BATTERY MODULE STACK FOR A MOTOR VEHICLE

CROSS REFERENCE TO RELATED APPLICATIONS

This application is a continuation of PCT International Application No. PCT/EP2018/069865, filed Jul. 23, 2018, which claims priority under 35 U.S.C. § 119 from German Patent Application No. 10 2017 213 470.4, filed Aug. 3, 2017, the entire disclosures of which are herein expressly incorporated by reference.

BACKGROUND AND SUMMARY OF THE INVENTION

The present invention relates to a battery module for a motor vehicle with improved properties in terms of structural arrangement and cooling of battery cells contained in the battery module. The invention further relates to a battery module stack for a motor vehicle and to a motor vehicle having such a battery module stack.

A battery as is frequently used in present-day applications for driving a motor vehicle, for example an electric vehicle or hybrid vehicle, typically consists of individual battery cells. A plurality of individual cells of this kind are each electrically connected to one another and combined to form the battery. However, inefficiencies in respect of utilization of the available space and cooling of the individual cells can occur when arranging the individual cells, and, given a predefined size of the battery, these inefficiencies can adversely affect the performance of the battery and reduce the electrical range of the vehicle.

US 2009/0297892 A1 discloses a battery storage module comprising a plurality of cylindrical cells. In order to increase the cell package density, the cells are arranged in an interconnected module configuration, so that adjacent cell centers form equilateral triangles. Tabs for coupling cells and modules to one another are provided within in each case one module and between the modules.

However, the use of tabs takes up a certain amount of space, which is no longer available to the cells, and requires the use of separate coolant ducts for the purpose of cooling the cells. Efficiency in terms of space utilization and cell cooling is reduced as a result.

The object of the present invention is therefore to eliminate or at least partially eliminate the above-described disadvantages in a battery for a motor vehicle. A particular object of the present invention is to provide a concept for a battery module comprising a plurality of battery cells and for a battery module stack, wherein efficiency in terms of space utilization by the battery cells and cooling of the battery cells is improved.

The above object is achieved by a battery module, by a battery module stack and by a vehicle in accordance with the claimed invention. Here, features and details which are described in the context of the battery module also apply in the context of the battery module stack or the vehicle and conversely in each case, with the result that, with respect to the disclosure, reference is always made or can always be made reciprocally to the individual aspects of the invention.

According to one aspect, the object is achieved by a battery module, preferably for a motor vehicle. The battery module comprises:

two contact-making plates, which are arranged parallel or approximately parallel in relation to one another, comprising a first and a second contact-making plate, and a plurality of battery cells which are arranged next to one another and between the two contact-making plates.

In each case one battery cell has a longitudinal axis and two axially opposite ends. The battery cell can preferably have a cell housing and be tubular or approximately tubular, wherein, in particular, longitudinal axes of battery cells can be parallel or approximately parallel in relation to one another. The longitudinal axes of the battery cells can form axes of rotation or axes of symmetry of the battery cells.

The ends of, in each case, one battery cell are connected to the contact-making plates, wherein in each case one battery cell can have a positive pole at the first end and a negative pole at the second end, and wherein the positive pole can preferably be designed as a raised portion of an end surface of the battery cell at the first end. The positive pole can be respectively connected to the first contact-making plate and the negative pole can be respectively connected to the second contact-making plate.

The battery cells are arranged in such a way that i) an outer circumferential surface of in each case one battery cell, which is completely surrounded by adjacent battery cells, touches outer circumferential surfaces of at least three adjacent battery cells, and ii) an outer circumferential surface of in each case one battery cell, which is not completely surrounded by adjacent battery cells, touches outer circumferential surfaces of at least two adjacent battery cells.

The designation of a battery cell as being completely surrounded by adjacent battery cells (neighboring cells) means that the battery cell is embedded in the middle of neighboring cells, wherein neighboring cells are located in a 360° surrounding area around the battery cell. The battery cell which is completely surrounded by neighboring cells is not located in an edge region of the battery cell area.

Accordingly, the designation of a battery cell as not being completely surrounded (by neighboring cells) means that the battery cell is located in an edge region of the battery cell area, wherein neighboring cells are arranged only in a surrounding area of less than 360° around the battery cell. As a result, this battery cell has fewer neighboring cells and therefore fewer contacts to neighboring cells.

According to a further aspect, the object is achieved by a battery module stack, preferably for a motor vehicle. The battery module stack comprises a plurality of battery modules according to the invention which are stacked axially one on the other. Here, the first contact-making plate of a respective battery module can correspond or be electrically connected to the second contact-making plate of a battery module situated above it. As a result, battery modules of a battery stack which are stacked one on the other can be connected electrically in series.

In the present document, the designations "top", "bottom", "above" or "below" are to be interpreted from the perspective of a viewer looking at an apparatus (battery cell, battery module or battery module stack) from the side, so that "top" relates to the north pole and "bottom" relates to the south pole of the respective apparatus. Therefore, on the one hand, the first end and the positive pole are located at the north pole of the battery cell and, on the other hand, the second end and the negative pole are located at the south pole of the battery cell. The arrangement of a second battery module above a first battery module is to be understood such that the second battery module is arranged on the or above the north pole of the first battery module.

According to a further aspect, the object is achieved by a motor vehicle, preferably an electric vehicle or hybrid vehicle, comprising a battery module stack according to the invention.

Features i) and ii) of the battery module have the effects of, firstly, battery cells being arranged next to one another or one on the other in a space-saving manner and of, secondly, mutual heat equalization being achieved between touching battery cells, in particular because the cell housing of in each case one battery cell is produced or can be produced from a thermally conductive material, for example from a metal or plastic. One advantage of these effects is that the space available for the battery cells can be utilized with high efficiency and high packing density, without redundant intermediate spaces; in other words, the battery cells can be positioned in a manner optimized in terms of space. A further advantage is that equalized temperature control of the battery cells can be achieved, without a separate cooling duct being required or used. The direct contact between the coolant and the battery cells, without a separate cooling duct, renders possible or ensures improved cooling efficiency of the battery cells.

An outer circumferential surface of in each case one battery cell, which is completely surrounded by adjacent battery cells (neighboring cells), can preferably touch outer circumferential surfaces of at least five, preferably of six, adjacent battery cells (neighboring cells). In particular, the outer circumferential surface of in each case one battery cell, which is not completely surrounded by adjacent battery cells, can touch outer circumferential surfaces of at least three or four adjacent battery cells.

The saving in terms of space and the packing density of the battery cells advantageously increase as the number of neighboring cells which are touched increases. The maximum number of neighboring cells which can be touched by a battery cell is six (given an identical diameter of the battery cells involved). Consequently, the maximum packing density or saving in terms of space is achieved when a battery cell touches six neighboring cells.

The cell housing can be connected to the negative pole and can be electrically conductive, wherein, in a state in which the battery cells are not fitted in the battery module, it has to be electrically insulated from the positive pole in order to ensure the basic functionality of the battery.

In a preferred development of the invention, the positive pole can be respectively directly connected to the first contact-making plate and the negative pole can be respectively directly connected to the second contact-making plate. Here, a direct connection is to be interpreted as an immediate, direct connection without an intermediate element. A connection between the positive pole and a first contact-making plate via an intermediate element which is arranged therebetween, for example a spring, is not to be interpreted as a direct connection.

This feature has the technical effect that an electric current can flow on a flow path between the positive pole and the first contact-making plate without losses or with only slight line losses. In other words, the current path has a high electrical conductivity or a low electrical resistance. Said effect has the advantage of improved battery performance and a greater electrical range of the vehicle in which the battery is installed. Batteries in which the positive pole and the first contact-making plate are not directly, but rather indirectly, connected, for example via a contact spring, have higher line losses in comparison.

In a preferred development of the invention, it is possible to ensure that, particularly in a state in which the battery cell is fitted in the battery module, the cell housing is electrically insulated from the first contact-making plate, and therefore is preferably electrically insulated from the positive pole, as a result of which the positive pole and the negative pole of a battery cell are electrically insulated from one another in a state in which the battery cell is fitted in the battery module. The negative pole of the battery cell is also electrically insulated from the first contact-making plate owing to the insulation of the first contact-making plate from the cell housing.

This feature has the effect of a simple structure of the battery module since no measures or at least no complicated or costly measures are required for the purpose of insulating the cell housing from the first contact-making plate. This effect has the advantage of reducing the complexity, the structural costs and the outlay on assembly for the battery module.

In a preferred development of the invention, provision can be made in a battery module for the positive pole of in each case one battery cell to be inseparably connected to the first contact-making plate. An inseparable connection can be produced, for example, by means of laser welding, that is to say a laser-welded connection, or by means of bonding, or by means of a press-fit connection, or a butt connection.

The inseparable (non-releasable) connection has the effect that the losses of the electric current on the current path between the positive pole and the first contact-making plate are further reduced since the contact area is preferably increased and the transfer resistance between elements which make contact via an inseparable connection is lower than in the case of elements which bear against one another more loosely. This effect has the advantage of further improving the battery performance and increasing the electrical range of the vehicle.

As an alternative to the inseparable connection, a releasable electrical connection can also be used, for example an interlocking and/or force-fitting connection, provided that sufficiently high mechanical forces act on the elements to be connected and/or the contact area is large. The contact resistance or transfer resistance can then advantageously likewise be reduced. A plug-in connection can preferably be used for this purpose.

In order to implement an interlocking and/or force-fitting connection, the first contact-making plate can have openings, preferably at points of intersection of longitudinal axes of respective battery cells with the first contact-making plate. In addition to this, the positive pole of in each case one battery cell can protrude into in each case one opening of the first contact-making plate in the axial direction in a manner averted from the housing, as a result of which the positive pole is connected in a force-fitting and direct manner to the first contact-making plate.

An interlocking and/or force-fitting connection can preferably be designed as a plug-in connection with a female connector and a male connector which can be inserted into the female connector, wherein the positive pole of in each case one battery cell forms the male connector and the opening of the first contact-making plate forms the female connector. In the simplest case, the female connector, which is designed as an opening, can have a smooth edge (usual embodiment or normal condition of an opening or a hole).

As an alternative, given a smooth opening edge, the female connector can have an inside diameter which is slightly smaller than an outside diameter of the male connector, or the lateral flanks of the positive pole can be slightly inclined in the axial direction, with the result that the positive pole forms a truncated cone which tapers at the top.

According to the two embodiments of the plug-in connection, it is ensured that i) the male connector exerts radial forces onto the female connector in a region of contact with the female connector, and/or ii) the region of contact has a large contact area, as a result of which the electrical contact of the plug-in connection is improved and, respectively, the corresponding transfer resistance is reduced.

As an alternative, a female connector (opening of the first contact-making plate) can have an opening edge which is formed from flexible, elastic ribs, with the result that, when the male connector is inserted into the female connector, the ribs are elastically spread, exert a radial force onto the male connector on account of their elasticity, and therefore mechanically lock or fix the male connector in the female connector in the axial direction. In spite of locking, the elasticity of the ribs ensures a certain axial movement clearance for the male connector and, respectively, the positive pole of the battery cells.

The force which is exerted on the male connector by ribs and the large contact area have the effect of reducing the electrical transfer resistance of the plug-in connection, that is to say the transfer resistance between the negative pole and the second contact-making plate, this being accompanied by the advantage of an improvement in the battery performance and, respectively, an increase in the electrical range of the vehicle.

In a preferred development of the invention, a battery module can comprise an electrically non-conductive, preferably elastic, insulation element which is arranged between the cell housing of in each case one battery cell and the first contact-making plate.

The insulation element, on account of its electrically insulating property and its position, has the effect of electrically insulating the cell housing from the first contact-making plate. This effect has the advantage that, firstly, production tolerances for the battery cells and contact-making plates and, secondly, assembly tolerances in respect of the arrangement or positioning of the components of the battery module can be permitted. This is linked to the probability of accidental electrical contact, which is caused by production or assembly tolerances, between the first contact-making plate and the cell housing of a respective battery cell being able to be considerably reduced by the insulation element. As a result, the costs of production and assembly of the battery module and/or battery module stack can advantageously be reduced.

An insulation element can preferably be designed in a plate-like manner, in particular as an elastomer or as an elastic diaphragm. As an alternative, the insulation element can also be designed in an annular manner, for example in the form of an insulation ring or a plurality of insulation rings, and can be arranged around the positive pole at the first end of a respective battery cell.

The elasticity of a plate-like or annular insulation element advantageously has the effect that, during assembly of the battery module, the first contact-making plate can be pushed in against the battery cells until a secure and stable structure is achieved, without needing to worry about the first contact-making plate accidentally making contact with the cell housing of a respective battery cell.

Lateral extents of an, in particular plate-like, insulation element can preferably match or approximately match lateral extents of the first or second contact-making plate. This has the effect that the insulation element covers the entire intermediate space between the battery cells and the first contact-making plate. This effect can advantageously facilitate and simplify assembly of the battery module and also increase electrical safety on account of a reduction in the probability of undesired electrical contacts or short circuits.

An insulation element can preferably have openings, in particular at points of intersection of the longitudinal axes of respective battery cells with the insulation element, with the result that in each case one opening of the insulation element is located above the positive pole of in each case one battery cell, as a result of which the positive pole can be guided through the opening. This advantageously facilitates and simplifies assembly of the battery module and also increases the electrical safety.

A positive pole of in each case one battery cell can advantageously protrude through in each case one opening of the insulation element in the axial direction in a manner averted from the housing. This has the effect that the cell housing is separated and therefore electrically insulated from the first contact-making plate by the insulation element.

When assembling a battery module stack, said battery module stack can be axially compressed. As a result, the interlocking and/or force-fitting connection can be produced by the plug-in connections outlined. The insulation element can correspond exactly or approximately to the first contact-making plate in respect of shape and extent, with the result that assembly of a battery module and/or battery module stack can comprise the following steps:

a) providing a second contact-making plate, or placing the second contact-making plate onto the first contact-making plate of a battery module which is situated therebeneath, for the purpose of assembling a first battery module;

b) positioning a plurality of battery cells approximately perpendicularly onto the contact-making plate and approximately axially parallel onto the second contact-making plate, with the result that the negative pole of in each case one battery cell makes electrical contact with the second contact-making plate;

c) directly connecting the negative poles of the battery cells to the second contact-making plate, in particular by means of a non-releasable connection, preferably by means of laser welding;

d) laying the plate-like insulation element loosely onto the battery cells, with the result that the positive poles of the battery cells can enter and/or enter the openings of the insulation element;

e) laying the first contact-making plate loosely onto the plate-like insulation element, wherein the positive poles of the battery cells can enter or enter the openings of the first contact-making plate;

f) pressing the first contact-making plate axially against the second contact-making plate;

g) repeating the preceding steps for the second and also for each further battery module which is to be added.

The axial compression in step f) of the structure obtained in steps a) to e) renders it possible for the positive pole of in each case one battery cell to be connected to the second contact-making plate electrically conductively and directly and/or inseparably or in a manner separable only with difficulty.

In a preferred development of the invention, in step c), the connection between the negative pole of in each case one battery cell and the second contact-making plate can be executed as a plug-in connection, as an alternative to a connection by means of welding, in particular laser welding. To this end, the second contact-making plate can have openings and the negative pole of the battery cell can be designed as a raised portion of the end surface of the battery cell at its second end, analogously to the positive pole. The statements made above with respect to the plug-in connection between the positive pole and the first contact-making plate also apply to this plug-in connection. In an implementation of this kind, assembly of the battery module and/or battery module stack can advantageously be considerably simplified and associated costs considerably reduced.

In a preferred development of the invention, provision can be made in the case of a battery module for the positive pole of in each case one battery cell to protrude beyond the first end, preferably also beyond the insulation element, in an axial direction in a manner averted from the housing. This has the effect that the raised portion, which constitutes the positive pole, of the end surface of a respective battery cell, at its first end, mechanically supports the first contact-making plate in the axial direction and at the same time forms a spacer between the first contact-making plate and the cell housing. The cell housing is therefore spaced apart and consequently also electrically insulated from the first contact-making plate. This effect has the advantage of reducing the complexity and the expenditure on assembly and also the associated costs for assembly of the battery module in a simply and cost-effectively achievable manner.

In a preferred development of the invention, a first and/or second contact-making plate can be respectively electrically conductive in regions or throughout. This has the effect that battery cells can be connected or are connected in parallel in regions or throughout. The effect has the advantage that battery cells of corresponding regions can be positioned or combined in different and separate groups or chambers in order to be able to electrically connect corresponding groups or chambers independently of one another, for example electrically in parallel or in series depending on requirements.

If the first and the second contact-making plate are respectively electrically conductive throughout, all battery cells situated therebetween are then connected in parallel throughout.

In a preferred development of the invention, a first and/or second contact-making plate can be elastic and preferably be composed of a conductive and elastic material, in particular a metal or plastic, wherein the material returns to its original condition after deformation and after revoking the deformation force. The first and/or second contact-making plate can, in a contact region with the battery cell, comprise an elastic diaphragm which may be curved in a direction averted from the battery cell and possibly has an opening. In order to improve the electrical conductivity, the first and/or second contact-making plate can, in the contact region, be lubricated with a contact paste which improves the electrical conductivity and which comprises, for example, copper, aluminum or graphite pigments.

The development has the effect of possibly equalizing thermal or tolerance-related fluctuations in an axial length of in each case one battery cell, preferably while at the same time reducing the transfer resistance in the contact region. This effect has the advantage that:

a) production tolerances for battery cells and contact-making plates, and/or assembly tolerances, in respect of the arrangement or positioning of the components of the battery module can be permitted, and/or b) improved battery performance and greater electrical range of the vehicle can be achieved, without complicated welding between a battery cell and a contact-making plate.

As a result, the costs of production and assembly of the battery module and/or battery module stack can advantageously be considerably reduced.

In a preferred development of the invention, the outer circumferential surface of a battery cell can touch the circumferential surface of an adjacent battery cell in a linear or strip-like contact region. In particular, the linear contact region occurs in the ideal case and the strip-like contact region occurs in practice. The contact region can have interruptions along its course and therefore consist of successive linear or strip-like contact regions, on account of possible unevennesses in the circumferential surface of a battery cell. The effectiveness of the thermal compensation between battery cells which make mutual contact increases as the width of the contact region increases.

In a preferred development of the invention, in each case one heat discharge duct can be formed between mutually facing regions, which are delimited by linear or strip-like contact regions, of outer circumferential surfaces of adjacent, touching battery cells. The corresponding contact regions can each delimit and preferably seal off a heat discharge duct. A contact region may possibly not be leaktight, with the result that a cooling medium circulating in a heat discharge duct flows into an adjacent heat discharge duct. The cooling medium can comprise or be, in particular, a cooling liquid or possibly air.

The development has the effect of direct contact between the cooling medium and battery cells and also between adjacent battery cells which directly exchange heat with one another, without a separate cooling duct being required or used. An advantage of this effect is efficient, uniform cooling of the battery cells. A further advantage is simplification of the cooling structure (a separate cooling duct is dispensed with) and an associated saving in material and costs.

The cooling medium can preferably possibly flow through the respective heat discharge duct, for the purpose of cooling adjoining battery cells. To this end, the cooling medium can be pumped or pressed into the heat discharge duct and guided out from there at the end of the heat discharge duct. The circulation of the cooling medium advantageously promotes cooling of the battery cells.

In a preferred development of the invention, a battery module can comprise a circulation system by means of which the cooling medium can be respectively supplied to a heat discharge duct and discharged from said heat discharge duct. The circulation system advantageously renders possible autonomous or independent operation of the battery module and/or battery module stack.

In a preferred development of the invention, a battery module can comprise at least two chambers which are arranged next to one another and between the two contact-making plates, wherein at least one first chamber and at least one second chamber are provided. The chambers can each comprise a plurality of battery cells and at least one heat discharge duct. In each case one chamber can be associated with a region of the first and a region of the second contact-making plate, wherein the respective region is electrically conductive throughout and possibly electrically insulated from adjacent regions of the same contact-making plate.

The separate chambers and the associated regional conductivity of the contact-making plates advantageously render possible flexible electrical interconnection (in series or in parallel) of battery modules of associated chambers with one another.

In each case one chamber can preferably comprise a wall which encompasses battery cells, which are arranged in the chamber, in a laterally encircling and enclosing manner. The wall can preferably be produced from a thermally conductive and, in particular, electrically insulating material, possibly from plastic.

The properties of the wall have the effect of heat exchange between adjacent chambers, wherein battery cells which are grouped or combined in in each case one chamber can be electrically connected independently of one another. The advantage of this effect is more uniform cooling or temperature control of the chambers and battery cells enclosed therein while retaining the flexibility in respect of electrical interconnection of the chambers, for example in parallel or in series depending on requirements.

In a preferred development of the invention, a circulation system can be designed to move or to circulate the cooling medium in such a way that the cooling medium is supplied to the first chamber, discharged from said first chamber and is supplied to the second chamber, and is discharged from said second chamber again. If a plurality of heat discharge ducts are provided in in each case one chamber, the cooling medium moves or flows through the heat discharge ducts of the chamber in question uniformly in one direction. This has the effect of a closed cooling circuit, wherein the cooling medium circulates through the chambers and between the chambers. The effect has the advantage that a compact construction of the battery module or battery module stack and/or uniform temperature control of the battery cells are/is rendered possible in this way.

In a preferred development of the invention, a first and/or second contact-making plate can have openings through each of which the cooling medium can be supplied to the respective heat discharge ducts or can be discharged from said heat discharge ducts by means of the circulation system. This has the advantageous effect that the circulation system or the cooling circuit is therefore functional and ready for operation.

Connections by means of which the cooling medium can be supplied to a chamber and/or can be discharged from said chamber can preferably be provided. The connections can be arranged above the first or below the second contact-making plate. This has the advantageous effect of a compact construction of the battery module or battery module stack because the circulation system or the cooling circuit and the battery module together form a closed-off, autonomous or independent unit which can be accommodated in a battery housing or overall housing.

The connections can preferably comprise an inlet or a plurality of, for example at least two, five or ten, inlets for supplying the cooling liquid into in each case one chamber. In addition, the connections comprise an outlet or a plurality of, preferably at least two, five or ten, outlets for discharging the cooling medium from in each case one chamber. A high number of connections has the effect of intense or fine branching of the cooling circuit. The advantage of this effect is good and uniform distribution of the heat discharge from the battery cells and uniform temperature control of the battery cells.

In a preferred development of the invention, a filling material can be introducible or can be introduced into in each case one heat discharge duct. The introduced filling material has the effect of:

i) reducing the flow cross section in the heat discharge duct, this preferably being accompanied by an increase in the flow rate of the cooling medium in the heat discharge duct, and/or ii) reducing the quantity of circulating cooling medium required.

Effect i) has the advantage of improved cooling efficiency for the battery cells, and effect ii) has the advantage of a saving in material and costs.

The filling material can preferably comprise an axial rod or hollow glass or plastic balls. This has the advantage of a structurally simple and economical possible way of increasing the cooling efficiency and of saving material.

In a preferred development of the invention, a circulation system can comprise a heat exchanger or a cooling apparatus for the purpose of cooling down the cooling medium. The heat exchanger can be arranged in an internal region of the battery module or battery module stack, for example in a lateral region of the internal region. In the case of a battery module stack comprising a plurality of battery modules, the cooling medium can be inserted into the first battery module and discharged from the axially opposite battery module, wherein the discharged liquid circulates through the heat exchanger and is cooled down there. The circulation system formed in this way, including the heat exchanger, has the advantage of an increased cooling effect and a compact construction of the battery module or battery module stack.

The circulation system also works when the battery module stack comprises a single battery module or when in each case one battery module comprises a single chamber.

In a preferred development of the invention, an opening of the second contact-making plate or of the insulation element can respectively bear directly or immediately against the respective heat discharge duct. This has the advantageous effect that an outflow of cooling medium during the transfer to the heat discharge duct can be prevented. In particular, the insulation element fulfills a sealing-off task, similarly to a seal between components of a system of fluid lines.

In a preferred development of the invention, the battery module or the battery module stack can comprise a battery housing (overall housing), preferably composed of aluminum, for the purpose of accommodating the battery module or battery module stack. This has the advantage of improved and easier handling of the battery module and/or battery module stack.

A battery module or battery module stack can preferably comprise electrically non-conductive and possibly mechanically shock-absorbing insulation rings which enclose the battery module stack in an enclosing manner, electrically insulate the contact-making plates from the battery housing and reduce or prevent a movement clearance for battery components in relation to the battery housing. This has the advantage that electrically safe operation and improved mechanical stability and vibration resistance are rendered possible or ensured in this way.

The vehicle has the same advantages as already described above in respect of the battery module and battery module stack according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Elements with the same function and manner of operation are in each case provided with the same reference signs in the figures shown.

Figure 1:
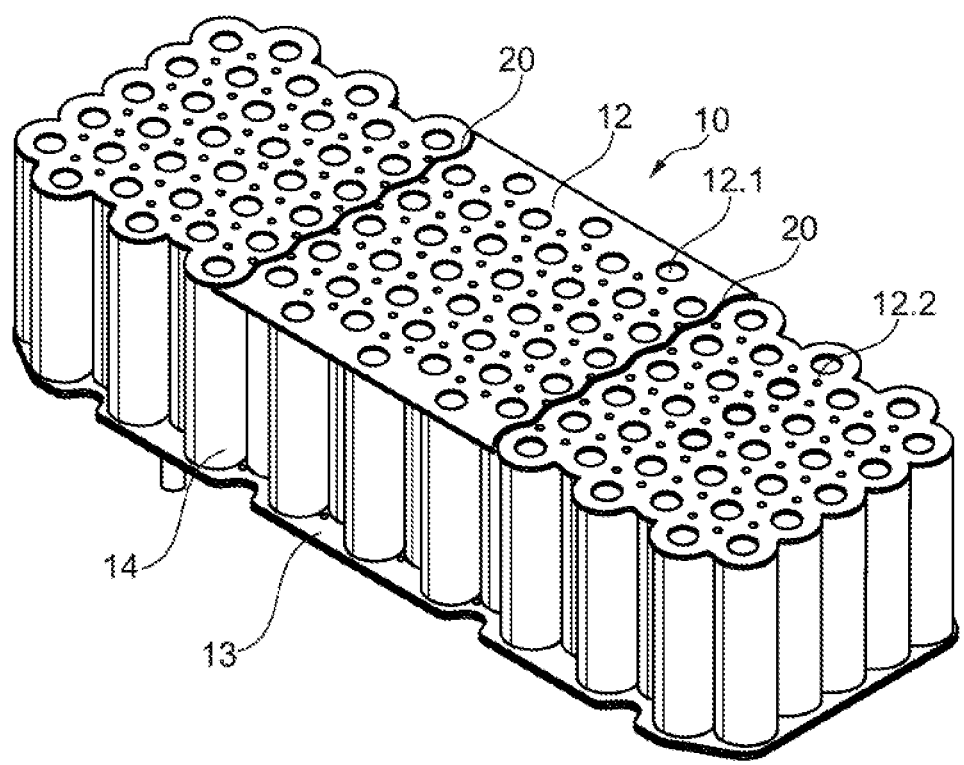
FIG. 1 schematically shows a perspective illustration of a preferred embodiment of a battery module according to the invention.

FIG. 1 shows a perspective illustration of a preferred embodiment of a battery module 10 according to the invention. The battery module 10 comprises two contact-making plates 12, 13, which are arranged parallel or approximately parallel in relation to one another, comprising a first and a second contact-making plate, and a plurality of battery cells 14 which are arranged next to one another and between the two contact-making plates 12, 13.

A battery module 10 comprises at least two chambers 20 which are arranged next to one another and between the two contact-making plates 12, 13, wherein at least one first chamber and at least one second chamber are provided. The chambers 20 each include a plurality of battery cells 14 and at least one heat discharge duct 18. In each case, one chamber is associated with a region of the first and a region of the second contact-making plate 12, 13, wherein the respective region is electrically conductive throughout and possibly electrically insulated from adjacent regions of the same contact-making plate. The separate chambers 20 and the associated regional conductivity of the contact-making plates preferably renders possible flexible electrical interconnection (in series or in parallel) of battery modules of associated chambers 20 with one another.

Figure 2A:
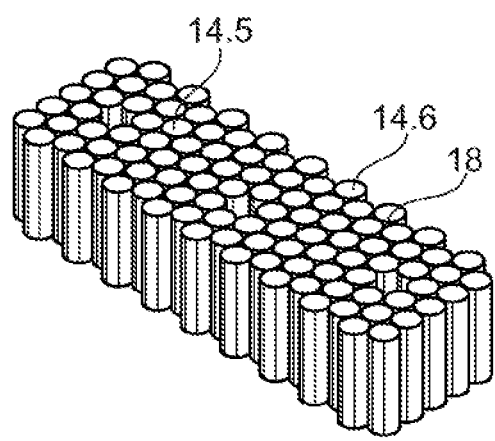
FIG. 2A schematically shows a perspective illustration of a plurality of battery cells of a battery module which are arranged next to one another.
Figure 2B:
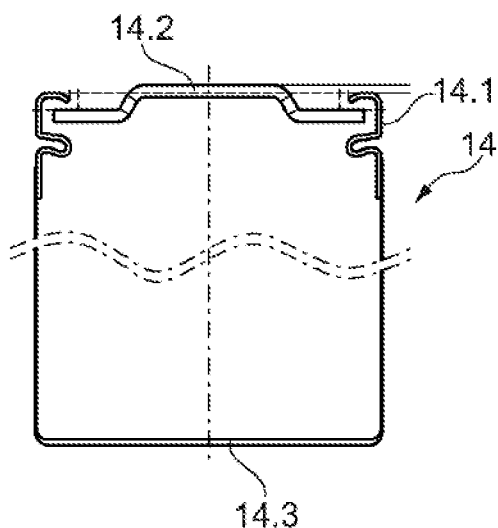
FIG. 2B schematically shows a side view of a single battery cell.

FIG. 2B shows a side view of a single battery cell 14. In each case one battery cell 14 has a cell housing 14.1 and also a longitudinal axis and two axially opposite ends. The battery cell 14 is tubular, wherein longitudinal axes of battery cells 14 are parallel in relation to one another. The longitudinal axes of the battery cells 14 form axes of rotation or axes of symmetry of the battery cells 14.

In each case, one battery cell 14 has a positive pole 14.2 at the first end and a negative pole 14.3 at the second end. The positive pole 14.2 is designed as a raised portion of an end surface of the battery cell 14 at the first end.

The positive pole 14.2 is respectively directly connected to the first contact-making plate 12 and the negative pole 14.3 is respectively directly connected to the second contact-making plate 13 (see FIG. 1).

The cell housing 14.1 is connected to the negative pole 14.3 and is electrically conductive, wherein, in a state in which the battery cells 14 are not fitted in the battery module 10, it is electrically insulated from the positive pole 14.2; the basic functionality of the battery is ensured in this way.

In the state in which the battery cell 14 is fitted in the battery module 10, the cell housing 14.1 is electrically insulated from the first contact-making plate 12 and therefore advantageously also from the positive pole 14.2, as a result of which the positive pole 14.2 and the negative pole 14.3 of a respective battery cell 14 are electrically insulated from one another in a state in which the battery cell 14 is fitted in the battery module 10. The negative pole 14.3 of the battery cell 14 is also electrically insulated from the first contact-making plate 12 owing to the insulation of the first contact-making plate 12 from the cell housing 14.1.

FIG. 2A shows a perspective illustration of a plurality of battery cells 14 of a battery module 10 which are arranged next to one another. The battery cells 14 are arranged in such a way that:

i) an outer circumferential surface of in each case one battery cell 14.5, which is completely surrounded by adjacent battery cells 14, touches outer circumferential surfaces of at least four adjacent battery cells 14, and ii) an outer circumferential surface of in each case one battery cell 14.6, which is not completely surrounded by adjacent battery cells 14, touches outer circumferential surfaces of at least two adjacent battery cells 14.

A battery cell 14.5 which is completely surrounded by adjacent battery cells 14 (neighboring cells) is embedded in the middle of neighboring cells, wherein neighboring cells are located in a 360° surrounding area around the battery cell 14.5.

An outer circumferential surface of in each case one battery cell 14.5, which is shown in FIG. 2A and is completely surrounded by adjacent battery cells 14, touches outer circumferential surfaces of six adjacent battery cells 14.

A battery cell 14.6 which is not completely surrounded by adjacent battery cells 14 (neighboring cells) is located in an edge region of the battery cell area, wherein neighboring cells are arranged only in a surrounding area of less than 360° around the battery cell 14.6.

An outer circumferential surface of in each case one battery cell 14.6, which is shown in FIG. 2A and is not completely surrounded by adjacent battery cells 14, touches outer circumferential surfaces of three adjacent battery cells 14.

In each case one heat discharge duct 18, shown in FIG. 2A, is formed between mutually facing regions, which are delimited by linear or strip-like contact regions, of outer circumferential surfaces of adjacent, touching battery cells 14. The corresponding contact regions delimit and seal off in each case one heat discharge duct 18.

Figure 3:
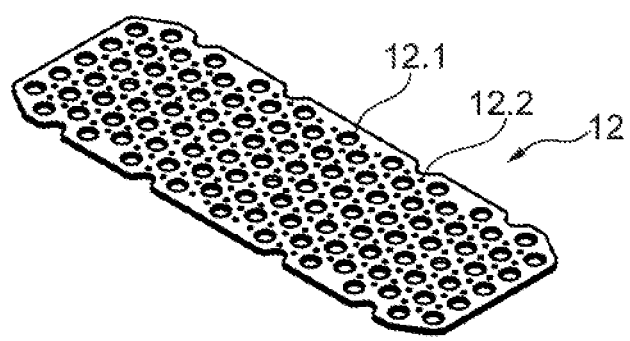
FIG. 3 schematically shows a perspective illustration of a first contact-making plate.

FIG. 3 shows a perspective illustration of a first contact-making plate 12. In order to implement an interlocking and/or force-fitting connection between the positive pole 14.2 of a battery cell 14 and the first contact-making plate 12, the first contact-making plate 12 has openings 12.1 at points of intersection of longitudinal axes of respective battery cells 14 with the first contact-making plate 12. In addition to this, the positive pole 14.2 of in each case one battery cell 14 protrudes into in each case one opening 12.1 of the first contact-making plate 12 in the axial direction in a manner averted from the housing, as a result of which the positive pole 14.2 is connected in a force-fitting and direct manner to the first contact-making plate 12. In addition to or instead of an interlocking and/or force-fitting connection, the positive pole 14.2 of in each case one battery cell 14 is connected to the first contact-making plate 12 via an inseparable connection, preferably by means of laser welding.

According to FIGS. 1 and 3, the first contact-making plate has openings 12.2 through each of which the cooling medium can be supplied to the respective heat discharge duct 18 or can be discharged from said heat discharge ducts by means of a circulation system (not shown).

LIST OF REFERENCE SYMBOLS

10 Battery module
12 First contact-making plate
12.1 Opening of the first contact-making plate for a battery cell positive pole 12.2 Opening of the first contact-making plate for a heat discharge duct
13 Second contact-making plate
14 Battery cell
14.1 Cell housing
14.2 Positive pole of a battery cell
14.3 Negative pole of a battery cell
14.5 Battery cell which is completely surrounded by adjacent battery cells
14.6 Battery cell which is not completely surrounded by adjacent battery cells
16 Insulation element, arranged between a battery cell and the first contact-making plate
16.1 Opening of the insulation element for a battery cell positive pole
16.2 Opening of the insulation element for a heat discharge duct
18 Heat discharge duct
20 Chamber, wall of a chamber The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A battery module for a motor vehicle, comprising:
   two contact-making plates, which are arranged parallel in relation to one another, comprising a first and a second contact-making plate; and
   a plurality of battery cells which are arranged next to one another and between the two contact-making plates, wherein
   each battery cell has a longitudinal axis and two axially opposite ends,
   the ends of each battery cell are connected to the contact-making plates,
   the battery cells are arranged such that i) an outer circumferential surface of a first battery cell, which is completely surrounded by adjacent battery cells, touches outer circumferential surfaces of at least three adjacent battery cells, and ii) an outer circumferential surface of a second battery cell, which is not completely surrounded by adjacent battery cells, touches outer circumferential surfaces of at least two adjacent battery cells,
   the battery module comprises a circulation system by which a cooling medium is supplied to a first chamber, is discharged from the first chamber, is supplied to a second chamber, and is discharged from the second chamber,
   the first and/or the second contact-making plate has openings through which the cooling medium respectively is supplied to respective heat discharge ducts or is discharged from the heat discharge ducts by the circulation system,
   the circulation system has connections by which the cooling medium is supplied to a chamber and/or is discharged from the chamber, and the connections are arranged above the first or below the second contact-making plate, and
   a filling material is introduced into one heat discharge duct, whereby a flow cross section of the heat discharge duct is reduced, as a result of which a flow rate of the cooling medium is increased.

2. The battery module according to claim 1, wherein at least one of:
   the outer circumferential surface of the first battery cell, which is completely surrounded by adjacent battery cells, touches outer circumferential surfaces of at least four battery cells;
   the outer circumferential surface of the second battery cell, which is not completely surrounded by adjacent battery cells, touches outer circumferential surfaces of at least three or four adjacent battery cells; or
   the outer circumferential surface of a battery cell touches the circumferential surface of an adjacent battery cell in a linear or strip-like contact region.

3. The battery module according to claim 2, wherein:
   one heat discharge duct is formed between mutually facing regions, which are delimited by linear contact regions, of outer circumferential surfaces of adjacent, touching battery cells; and
   a cooling medium is flowable through the respective heat discharge duct for purpose of cooling adjoining battery cells.

4. The battery module according to claim 2, wherein
   the outer circumferential surface of the second battery cell touches outer circumferential surfaces of six adjacent battery cells.

5. The battery module according to claim 1, wherein:
   the first and the second contact-making plate are each electrically conductive in regions or throughout, as a result of which battery cells are connected in parallel in regions or throughout;
   the first chamber and the second chamber are arranged next to one another and between the two contact-making plates; and
   each chamber comprises a wall which encompasses battery cells, which are arranged in the chamber, in a laterally encircling and enclosing manner and is produced from a thermally conductive and electrically insulating material.

6. The battery module according to claim 5, wherein the wall is a plastic material wall.

7. The battery module according to claim 1, wherein:
   each battery cell has a positive pole at a first end, a negative pole at a second end and a cell housing, wherein the positive pole is respectively directly connected to the first contact-making plate and the negative pole is respectively directly connected to the second contact-making plate.

8. The battery module according to claim 7, wherein the cell housing is electrically insulated from the first contact-making plate.

9. The battery module according to claim 7, wherein:
   the positive pole of each battery cell, which positive pole is designed as a raised portion of an end surface of the battery cell at the first end, is inseparably connected to the first contact-making plate; and
   the negative pole of each battery cell is inseparably connected to the second contact-making plate.

10. The battery module according to claim 9, wherein the positive and negative poles are inseparably connected to the first and second contact-making plates, respectively, via laser welding.

11. A battery module stack for a motor vehicle, comprising:
    a plurality of battery modules according to claim 1, wherein the battery modules are stacked axially one on the other, and
    the battery modules are connected electrically in series.

12. A motor vehicle comprising a battery module stack according to claim 11.

\* \* \* \* \*